United States Patent
Cheon et al.

(10) Patent No.: US 8,738,227 B2
(45) Date of Patent: May 27, 2014

(54) DARK CURRENT CUTOFF SYSTEM AND METHOD FOR VEHICLE JUNCTION BOX

(75) Inventors: Wang Seong Cheon, Gyeonggi-do (KR); Young Kug Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/605,010

(22) Filed: Sep. 6, 2012

(65) Prior Publication Data

US 2013/0297147 A1 Nov. 7, 2013

(30) Foreign Application Priority Data

May 3, 2012 (KR) .......................... 10-2012-0047181

(51) Int. Cl.
- *G06F 1/32* (2006.01)
- *H02H 7/18* (2006.01)
- *B60R 16/00* (2006.01)

(52) U.S. Cl.
USPC ............ 701/36; 307/10.7; 327/544; 713/320; 713/501; 713/502

(58) Field of Classification Search
None
See application file for complete search history.

(56) References Cited

U.S. PATENT DOCUMENTS

| | | | |
|---|---|---|---|
| 6,198,995 B1* | 3/2001 | Settles et al. .................. | 701/29.1 |
| 8,350,615 B2* | 1/2013 | Nagoshi et al. ............... | 327/518 |
| 2004/0119517 A1* | 6/2004 | Pauletti et al. ................ | 327/198 |
| 2011/0228429 A1* | 9/2011 | Ueta et al. ....................... | 361/31 |
| 2012/0292987 A1* | 11/2012 | Rutkowski et al. ............ | 307/9.1 |

FOREIGN PATENT DOCUMENTS

| | | | |
|---|---|---|---|
| EP | 1066173 B1 * | 5/2003 | |
| KR | 10-0476211 | 4/2004 | |
| KR | 10-2010-0116447 | 11/2010 | |

\* cited by examiner

*Primary Examiner* — Behrang Badii
*Assistant Examiner* — Demetra Smith-Stewart
(74) *Attorney, Agent, or Firm* — Edwards Wildman Palmer LLP; Peter F. Corless

(57) ABSTRACT

Disclosed is a dark current cutoff system and method for a vehicle junction. In particular, a controller is configured to monitor signal input through a CAN communication module to determine when other modules in the vehicle are in a sleep mode, cut off battery power to a load device by turning off a switching element when the controller determines that the other modules in the vehicle are in sleep mode, and forcibly maintains an off state of the switching element for a set period time after the power has been cut, regardless of signal input through the CAN communication module.

3 Claims, 3 Drawing Sheets

DARK CURRENT CUTOFF SYSTEM AND METHOD FOR VEHICLE JUNCTION BOX

CROSS-REFERENCE TO RELATED APPLICATION

This application claims under 35 U.S.C. §119(a) the benefit of Korean Patent Application No. 10-2012-0047181 filed on May 3, 2012, the entire contents of which are incorporated herein by reference.

BACKGROUND (a) Technical Field

The present invention relates to a dark current cutoff system and method for a vehicle junction box. More particularly, the present invention relates to a dark current cutoff system and method for a vehicle junction box, in which the vehicle junction box cuts off a dark current consumed by a load device after powering down, thereby minimizing the battery discharge problem caused by the dark current.

(b) Background

A vehicle typically utilizes a junction box for supplying battery power to various electronic devices consuming electricity in the vehicle, such as lamps, body electrical/electronic parts, multimedia devices, motor driving devices, etc. In this junction box are installed relays for opening and closing a plurality of fuses or power supply to prevent delivery of overcurrent or overload to an external circuit.

The junction box mainly supplies and distributes battery power, wire protection, and so forth, and also functions as a housing and protection for various other related elements (e.g., fuses, relays, etc.) mounted thereon, operation efficiency maintenance through rapid heat emission, etc.

Since various electrical devices using battery power are connected in the junction box, a technique for cutting off "dark current" consumed by those electrical devices is often applied to a junction box. "Dark current" refers to current consumed by various load devices which use battery power even after the vehicle has been powered off. Once a certain amount of time has elapsed from production of the vehicle until delivery of the vehicle to a customer or the vehicle has not been operated for a long time due to export, long-term storage, parking, or the like, the battery may become discharged due to dark current flows through a load device using B+ power of the vehicle at all times (i.e., even when the vehicle is turned off).

To solve this problem, a dark current cutoff device for cutting off a power supply path between a battery and a load device until delivery to a customer is typically used in a junction box, and an example of this scheme is the application of a power connector.

That is, a power connector connected with a fuse may be installed in the junction box which is disposed between the battery and the load device; when the power connector is connected with the junction box, battery power can be provided to the load device, but when the power connector is disconnected, the power supply path to the load device is cut off. Thus, the power connector is disconnected until delivery of the vehicle to the customer (or by a driver if the vehicle is not going to be used for a long time), thus minimizing the battery discharge caused by dark current.

This power connector, however, is difficult to manipulate, and therefore as a result a Smart Junction Box (SJB) has been developed. IN the SJB, a dark current cut off device (power cut device) cutting off battery discharge caused by dark current is applied using a mode switch and a switching element.

Such a scheme solves a problem of an existing power connector which manually cuts off battery power and dark current, such that if a mode switch is turned off until delivery of the vehicle to the customer at an export or dealer stage the power supply path is cut off like in the disconnection of the power connector.

On the other hand, when the vehicle is delivered to the customer, the mode switch is turned on, such that the battery power can be normally provided to the load device in the vehicle. When the SJB is applied, even if the mode switch is turned off, the power cut state is released upon opening of the vehicle door or startup by a dealer and the battery power is normally connected to the load device.

In the SJB to which the mode switch is applied, even when a driver mistakenly leaves the interior lights on, a door half-closed, a hood open, a trunk open, etc., The power to the indoor lamps is automatically cut off after a predetermined time, thus preventing discharge.

In the SJB, a controller in the SJB is connected with other modules in the vehicle, such as a body control module (BCM), a driver door module (DDM), and so forth, in a way to enable controller area network (CAN) communication (B-CAN communication) therewith. Thus, the controller checks mode states of other modules in the vehicle, i.e., a sleep mode or a wakeup mode state, to perform a power cutting operation for cutting off dark current to a load device or a power cut release operation for enabling power supply accordingly.

The controller in the SJB turns on/off a switching element, such as a relay, for opening and closing power to the load device during the power cut or release operation, thus cutting off the power supply path to the load device (i.e., cutting off the battery power and dark current) or activating the power supply path for supplying power (releasing the power cut).

The controller, upon recognizing that each of a plurality of modules in the vehicle have entered sleep mode, turns off the switching element to cut off the battery power to the load device. In this case, if any signal is not input from other modules in the vehicle through CAN communication, the controller recognizes that such modules are in the sleep mode, and in the sleep mode, the controller cuts off the battery power by turning off the switching element connected to the load device after a predetermined time.

If the door of the vehicle is opened or accessory devices of other modules in the vehicle operate, the mode states of the modules are switched to the wakeup mode, and at this time, once the controller receives a signal indicating that the controller should switch to the wakeup mode from the modules through CAN communication, the controller performs a power cut release operation to turn on the switching element to supply the battery power to the load device again.

However, in the foregoing dark current cutoff scheme, normal dark current cut off may not be achieved due to noise generated at a moment when the power is cut off by turning off the switching element after the sleep mode of other modules of the vehicle in the junction box is recognized. That is, even when the controller of the junction box recognizes that all the modules in the vehicle are in the sleep mode and thus turns off the switching element, an arbitrary noise signal (abnormal CAN signal) may be input to the controller of the junction box from a module through a CAN communication module due to a capacitor component of a circuit in the module such as an amplifier.

In this case, the controller incorrectly recognizes that the module has been switched to the wakeup mode. As a result, the switching element is turned on, the power is reconnected (power cut release), and actual switching to the wakeup mode is established. As a result, even when the controller of the junction box recognizes the sleep mode of the module again and then performs the power cut operation by turning off the switching element, if a wrong CAN signal is input to the controller within a delay time in which a capacitor component is discharged from a particular module in the vehicle, the same malfunction may repetitively occur, thereby resulting in fully discharged battery.

SUMMARY OF THE DISCLOSURE

The present invention has been made in an effort to solve the above-described problems associated with prior art, and provides a dark current cutoff system and method for cutting off dark current of a vehicle junction box, which can solve a conventional problem in which malfunction of a dark current cutoff device occurs due to noise generated at the moment when power cutoff is performed after entry of other modules in a vehicle to a sleep mode have been recognized through CAN communication.

In one aspect, the present invention provides a dark current cutoff method for a vehicle junction box, the dark current cutoff method including a process of monitoring, by a controller of the junction box, signal input through a CAN communication module to check if other modules in the vehicle are in a sleep mode, a power cut process of cutting off battery power to a load device by turning off a switching element once the controller has recognized that the other modules in the vehicle are in the sleep mode, and a process of forcibly maintaining, by the controller of the junction box, the off state of the switching element for a set time after the power cut process, regardless of signal input through the CAN communication module.

The controller may again monitor signal input through the CAN communication module after a set time interval has elapsed, and may maintain the power cut state as long as the sleep mode of the other modules in the vehicle has been maintained.

In another aspect, the present invention provides a dark current cutoff system for a vehicle junction box, the dark current cutoff system including a CAN communication module of the junction box configured to allow CAN communication with other modules in a vehicle, a controller of the junction box configured to monitor signal input through the CAN communication module and output a control signal for cutting off power battery to a load device once the controller recognizes that the other modules in the vehicle are in a sleep mode, and a switching element configured to cut off the battery power to the load device by being turned off by the control signal of the controller, in which the controller forcibly maintains the off state of the switching element for a set period of time after execution of power cut, regardless of signal inputs through the CAN communication module.

The controller may again monitor signals input through the CAN communication module after a certain period of time has elapsed, and may maintain the power cut state as long as the sleep mode of the other modules in the vehicle is maintained.

BRIEF DESCRIPTION OF THE DRAWINGS

The above and other features of the present invention will now be described in detail with reference to a certain exemplary embodiment thereof illustrated the accompanying drawings which are given hereinbelow by way of illustration only, and thus are not limitative of the present invention, and wherein.

Figure 1:
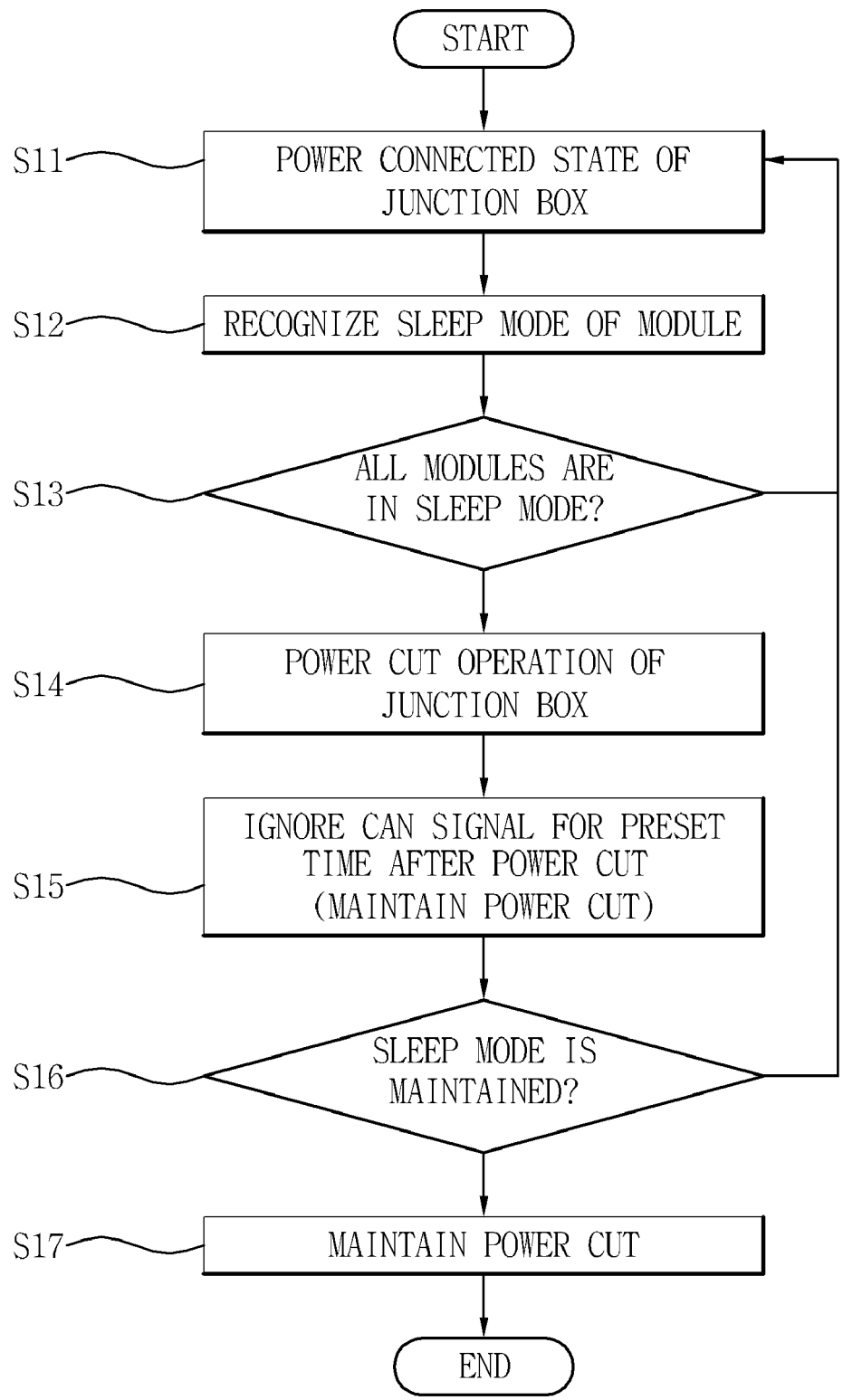
FIG. 1 is a flowchart of a dark current cutoff method according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings to allow those of ordinary skill in the art to easily carry out the present invention. While the invention will be described in conjunction with the exemplary embodiment, it will be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
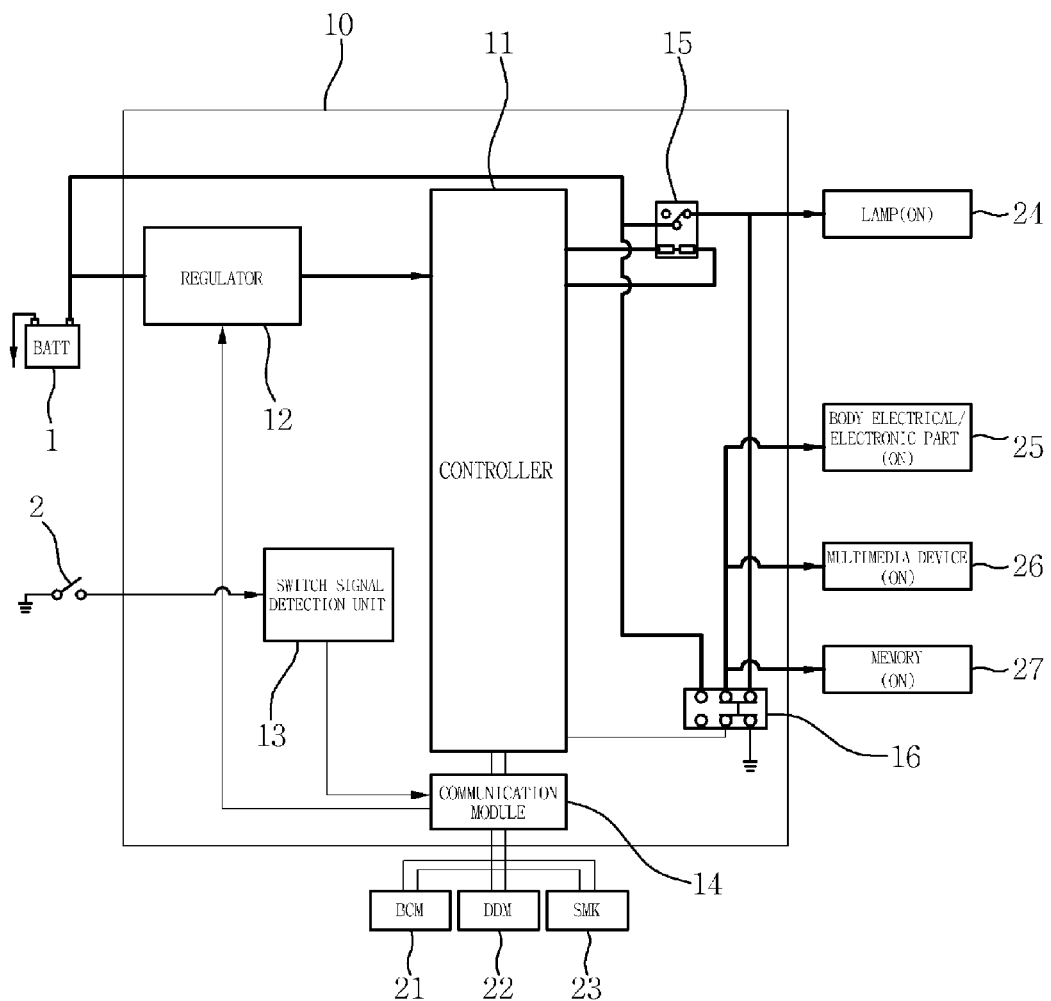
FIG. 2 shows a state in which battery power is connected to a load device from a junction box in a dark current cutoff process according to an exemplary embodiment of the present invention.
Figure 3:
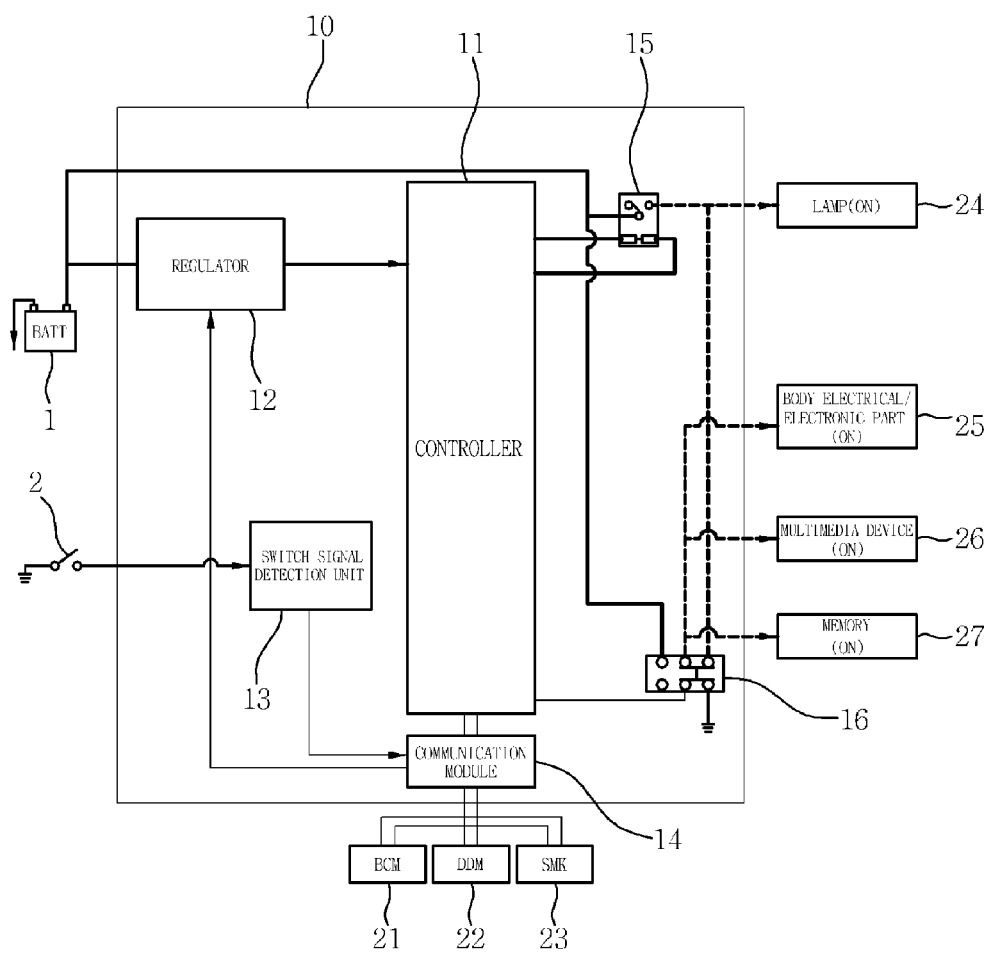
FIG. 3 shows a state in which battery power to a load device is cut off from a junction box in a dark current cutoff process according to an exemplary embodiment of the present invention.

FIG. 1 is a flowchart of a dark current cutoff method according to an exemplary embodiment of the present invention, FIG. 2 shows a state in which battery power is connected to a load device from a junction box in a dark current cutoff process according to an exemplary embodiment of the present invention, and FIG. 3 shows a state in which battery power to a load device is cut off from a junction box in a dark current cutoff process according to an exemplary embodiment of the present invention.

As shown in FIG. 1, in the present invention, a sort of fail safe logic (steps S15-S17 indicated by dotted lines) may be added to a power cut operation logic of the junction box, e.g., a SJB, thus preventing conventional malfunction of a dark current cutoff function caused by noise. Before undertaking a description of the dark current cutoff process according to the present invention, a structure for cutting off dark current in the junction box will be described first with reference to FIG. 2.

As shown in FIG. 2, a controller 11 is provided to control overall function of a junction box 10, such as power supply, power cutoff, etc. in the junction box 10, and the controller 11 may be connected with other modules in a vehicle through a CAN communication module 14 in a way to enable CAN communication with the other modules.

The other modules in the vehicle are not specifically limited in the present invention, but for example, they may be any one of a plurality of modules such as a body control module (BCM) 21, a driver door module (DDM) 22, an assist door module (ADM) (not shown), a smart key module (SMK) 23, a cluster (not shown), and so forth.

For dark current cutoff, in the junction box 10 is also provided a switching element 15 which is turned on or off to open or close power to load devices 24 through 27 according to a control signal of the controller 11. As the switching element 15, a relay may be used as shown in FIG. 2. FIG. 2 illustrates a situation in which each of the load devices are being provided with battery power. When the controller 11 maintains the on-state of the switching element 15, a load connected to the switching element 15 of the junction box 10, such as a lamp 24 or the like, can be provided with power, and in this state, a body electrical/electronic 25, a multimedia device 26, a memory 27 (or wakeup load), etc., can be provided with power through a mode switch 16.

On the other hand, FIG. 3 shows a power cutoff state, that is, a power cut state for cutting off dark current. After the vehicle is turned off, once the controller 11 of the junction box 10 recognizes that the other modules 21 through 23 in the vehicle are in a sleep mode state, the controller 11 performs a power cut operation by turning off the switching element 15 after a predetermined time (e.g., 20 minutes) as elapsed. Once the switching element 15 is turned off, power connection to the load such as the lamp 24 is cut off and power connection to loads connected through the mode switch 16, such as the body electrical/electronic part 25, the multimedia device 26, and the memory 27, is also cut off.

In this power cut state, power connection to the load are cut off (i.e., the power supply path is cutoff) while the modules 21 through 23 in the vehicle maintain a sleep mode, thereby preventing discharge of a battery 1 due to dark current consumed by those loads.

That is, when the controller 11 of the junction box 10 does not receive any signal from the modules 21 through 23 in the vehicle through the CAN communication module after a predetermined time, the controller 11 recognizes that each of the modules 21 through 23 in the vehicle are in the sleep mode state. Thus, upon input of an arbitrary signal to the controller 11 from a module, the junction box 10 is switched to the power connected state of FIG. 2.

However, conventionally, as previously mentioned, if a false signal caused by noise generated at a moment when the power is cut, in particular, a capacitor component from any one module among the plurality of modules, is input to the controller of the junction box through the CAN communication module, unfortunately, the power cut state of the junction box may be released.

In the present invention, to solve the malfunction of the dark current cutoff device (power cut release due to noise signal), a fail safe logic is added to an existing dark current cutoff logic, as will be later described in more detail with reference to FIG. 1.

In FIGS. 2 and 3, reference numeral 12 indicates a regulator for regulating battery power to the controller 11 in the junction box 10, and reference numeral 13 refers to a switch signal detection unit for detecting an on/off signal of a startup switch 2. The controller 11 of the junction box 10 recognizes when the vehicle is started from a signal from the switch signal detection unit 13.

Hereinafter, a power cutoff process according to the present invention, in particular, a power cut process for cutting off dark current in the structure shown in FIGS. 2 and 3 will be described with reference to FIG. 1.

First, when the modules 21 through 23 in the vehicle are not in the sleep mode, for example, when any one of the modules 21 through 23 are in a wakeup state, in spite of the off state of the startup switch 2, the state of the junction box enters the power connected state as shown in FIG. 2, and at this time, the power from the battery 1 is normally supplied to the load devices 24 through 27 in a state where the power supply path is activated (the on state of the switching element).

Upon generation of such a command or manipulation which is set to input a signal to the controller 11 from a corresponding module (e.g., BCM or the like) through the CAN communication module 14, as on-manipulation of the startup switch 2, opening of the door, lighting of at least one lamp, generation of a remote controller key, or the like, the corresponding module is switched from the sleep mode to the wakeup mode.

In this state, when the mode-switched signal is delivered from the corresponding module to the controller 11 of the junction box 10, the controller 11 recognizes that the module is in wakeup mode and thus turns on the switching element 15, so power is connected in the junction box accordingly as shown in FIG. 2.

In the power connected state in step S11, once a predetermined sleep condition has been identified is satisfied, the modules 21 through 23 in the vehicle are switched to the sleep mode. Once the controller determines that all the modules 21 through 23 in the vehicle are in the sleep mode in steps S12 and S13, that is, once the controller has not received a signal from any one of the modules for a predetermined period of time, the controller 11 of the junction box 10 performs a power cut operation by outputting a control signal for turning off the switching element 15 and cutting off the power to the load devices 24 through 27 in step S14.

In this case, conventionally, if an arbitrary signal is input to the controller of the junction box through the CAN communication module, upon input of a wrong signal due to noise as well as a normal wakeup mode switch signal, the controller recognizes that the sleep mode is released and turns on the switching element. To prevent such malfunction, in the present invention, the controller 11 ignores a CAN signal input through the CAN communication module 14 for a preset time period of time immediately after cutting off power to the load devices, and forcibly maintains an off state of the switching element 15 during this time in step S15.

Herein, the preset time is a time in which noise output due to a capacitor component of an amplifier can be sufficiently removed from all of the modules 21 through 23, and for example, it may be set to 5 seconds.

In the power cut state, after an elapse of the preset time, the controller 10 again monitors signal input through CAN communication, so that the controller 10 may continuously maintain an accurate power cut state as long as the sleep state of the modules 21 through 23 is maintained, in steps S16 and S17. However, once a wakeup mode switch signal is input through the CAN communication module 14, the controller 11 of the junction box 10 turns on again the switching element 15 to release the power cut state and to supply the battery power to the load devices 24 through 27.

Thus, in the dark current cutoff system and method for the junction box according to the present invention off state of the switching element is forcibly maintained regardless of signal input through the CAN communication module for a preset time to remove an influence of the noise signal input from other modules in the vehicle after power has been cut, thereby effectively preventing conventional malfunction of the dark current cutoff functions. In addition, battery discharge can be minimized by an accurate dark current cutoff operation and vehicle's startup can be guaranteed as well as battery durability can also be secured.

While an exemplary embodiment of the present invention has been described in detail, the protection scope of the present invention is not limited to the foregoing embodiment and it will be appreciated by those skilled in the art that various modifications and improvements using the basic concept of the present invention defined in the appended claims are also included in the protection scope of the present invention.

What is claimed is:

1. A dark current cutoff method for a vehicle junction box, the dark current cutoff method comprising:
   monitoring, by a controller of the junction box, signal input through a controller area network (CAN) communication module to determine when other modules in the vehicle enter a sleep mode;
   cutting off battery power to a load device by turning off a switching element by the controller once the controller determines that the other modules in the vehicle are in the sleep mode;
   ignoring, by the controller, all CAN signals input through the CAN communication module for a preset period of time immediately after the step of cutting off battery power to the load device; and
   forcibly maintaining, by the controller of the junction box, the off state of the switching element for the preset period of time after the step of cutting off battery power to the load device, regardless of signal input through the CAN communication module; and
   after elapse of the preset period of time, again monitoring, by the controller of the junction box, signal input through the CAN communication module, so that the controller continuously maintains a power cut state while the other modules are in the sleep mode.

2. A dark current cutoff system for a vehicle junction box, the dark current cutoff system comprising:
   a controller area network (CAN) communication module of the junction box configured to perform CAN communication with other modules in a vehicle;
   a controller of the junction box configured to monitor signal input through the CAN communication module and output a control signal that cuts off battery power to a load device once the controller determines that the other modules in the vehicle are in a sleep mode; and
   a switching element configured to cut off the battery power to the load device in response to a control signal from the controller,
   wherein the controller ignores all CAN signals input through the CAN communication module for a preset period of time immediately after cutting off the battery power to the load device, and forcibly maintains an off state of the switching element for the preset period of time after the power has been cut, regardless of signal input through the CAN communication module; and
   after elapse of the preset period of time, the controller of the junction box again monitors signal input through the CAN communication module, so that the controller continuously maintains a power cut state while the other modules are in the sleep mode.

3. A non-transitory computer readable medium containing program instructions executed by a controller, the computer readable medium comprising:
   program instructions that monitor signal input through a controller area network (CAN) communication module to determine when other modules in the vehicle enter a sleep mode;
   program instructions that cut off battery power to a load device by turning off a switching element by the controller once the controller determines that the other modules in the vehicle are in the sleep mode;
   program instructions that ignore all CAN signals input through the CAN communication module for a preset period of time immediately after the battery power is cut off to the load device; and
   program instructions that forcibly maintain the off state of the switching element for the preset period of time after the power the battery power is cut off to the load device, regardless of signal input through the CAN communication module; and
   program instructions that again monitor, after elapse of the preset period of time, signal input through the CAN communication module, so as to continuously maintain a power cut state while the other modules are in the sleep mode.

* * * * *